United States Patent
Loeb et al.

(10) Patent No.: US 8,683,553 B2
(45) Date of Patent: Mar. 25, 2014

(54) SYSTEM, METHOD, AND COMPUTER PROGRAM PRODUCTS FOR ENABLING TRUSTED ACCESS TO INFORMATION IN A DIVERSE SERVICE ENVIRONMENT

(75) Inventors: Shoshana K. Loeb, Philadelphia, PA (US); Stanley Moyer, Mendham, NJ (US); Thimios Panagos, Madison, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 367 days.

(21) Appl. No.: 12/652,772

(22) Filed: Jan. 6, 2010

(65) Prior Publication Data
US 2010/0175112 A1 Jul. 8, 2010

Related U.S. Application Data

(60) Provisional application No. 61/142,990, filed on Jan. 7, 2009.

(51) Int. Cl.
*G06F 7/04* (2006.01)

(52) U.S. Cl.
USPC ................... 726/4; 726/1; 726/27

(58) Field of Classification Search
USPC .............................. 726/27, 1, 3–4
See application file for complete search history.

(56) References Cited

U.S. PATENT DOCUMENTS

| 7,096,491 B2* | 8/2006 | Cheng ........................ 726/4 |
| 7,240,213 B1* | 7/2007 | Ritter ........................ 713/182 |
| 7,720,463 B2* | 5/2010 | Marsico ..................... 455/410 |
| 2002/0010705 A1 | 1/2002 | Park et al. |
| 2002/0078049 A1* | 6/2002 | Samar ......................... 707/9 |
| 2005/0228899 A1* | 10/2005 | Wendkos et al. ........... 709/232 |
| 2005/0257062 A1* | 11/2005 | Ignatius et al. ............. 713/176 |
| 2007/0043608 A1* | 2/2007 | May et al. .................. 705/10 |
| 2007/0266256 A1 | 11/2007 | Shah et al. |
| 2010/0017846 A1* | 1/2010 | Huang et al. ................ 726/1 |

OTHER PUBLICATIONS

Lafontaine, et al., "A Little Too Personal: Privacy Concerns Dot Mobile Revenue Landscape" http://www.naa.org/Resources/Articles/Digital-Media-Moving-To-Mobile-Privacy/Digital-Media-Moving-To-Mobile-Privacy.aspx, Jul. 31, 2008.

Davis, W., "FTC Asked to Protect Mobile Privacy" Online Media Daily, http://www.mediapost.com/publications/?fa=Articles.showArticle&art_aid=98192, Jan. 13, 2009.

Stelter, B., "Facebook's Users Ask Who Owns Information," The New York Times, http://www.nytimes.com/2009/02/17/technology/internet/17facebook.html?_r=1, Feb. 16, 2009.

Vascellaro, J.E., "Google Inquiry Sought Over Privacy Concerns," The Wall Street Journal, http://online.wsj.com/article/SB123732931086262623.html, Mar. 18, 2009.

(Continued)

*Primary Examiner* — Samson Lemma
(74) *Attorney, Agent, or Firm* — Philip J. Feig

(57) ABSTRACT

A system, method, and computer program product for enabling mediated access to information controlled by one or more information repositories by one or more application service providers. The information controlled by the one or more information repositories is associated with one or more subscribers of information-based services offered by the one or more application service providers.

12 Claims, 8 Drawing Sheets

(56) References Cited

OTHER PUBLICATIONS

Moyer, S., et al., "Trusted Access to Sensitive Information in a Diverse Services Environment," Telcordia Technologies, Proceedings of IEEE CCNC 2010, Jan. 2010, Las Vegas, NV, http://www.ieee-ccnc.org/2010/.

International Search Report, dated Mar. 15, 2010 (2 pages).

* cited by examiner

SYSTEM, METHOD, AND COMPUTER PROGRAM PRODUCTS FOR ENABLING TRUSTED ACCESS TO INFORMATION IN A DIVERSE SERVICE ENVIRONMENT

CROSS-REFERENCE TO RELATED APPLICATIONS

The present invention claims the benefit of U.S. provisional application No. 61/142,990 filed Jan. 7, 2009, the entire contents and disclosure of which are incorporated herein by reference as if fully set forth herein.

FIELD OF THE INVENTION

The present invention relates generally to enabling mediated access by an application service provider to information associated with subscribers to services offered by the application service provider.

BACKGROUND OF THE INVENTION

With the growing ubiquity of Internet access, a growing number of application service providers are offering services in the form of software applications over communication networks to entities that subscribe to such services. The application service providers increasingly utilize information associated with a subscriber to provide targeted and/or relevant services to the subscriber.

Information associated with a subscriber may, however, be sensitive and/or confidential in nature. Therefore, application service providers are trying to strike a balance between offering targeted and/or relevant services based on sensitive and/or confidential information, and safeguarding the privacy of such information.

BRIEF SUMMARY OF THE INVENTION

An inventive trusted entity for use in a communication network is presented, the communication network having an application service provider that provides one or more computer-based services to one or more subscribers, the inventive trusted entity comprising an access control rule determination unit for determining an access control rule to be enforced against the application service provider making a request for information associated with a subscriber, the access control rule being determined based on at least one of a subscriber-defined access policy, and a system-defined access policy and an access control rule enforcement unit for enforcing the access control rule against the application service provider.

BRIEF DESCRIPTION OF THE DRAWINGS

The present invention will be described with reference to the accompanying drawings, wherein.

DETAILED DESCRIPTION OF THE INVENTION

Embodiments of the present invention provide systems, associated methods, and computer program products for mediating an application service provider's access to information associated with subscribers of a software application provided by the application service provider.

The term "application service provider" (ASP) shall be used to describe an entity that provides one or more services in the form of software applications (i.e., computer software designed to help the user perform a particular task) to subscribers to such services.

An ASP may provide software applications using different models of software deployment. As an example, an ASP may host a software application and provide access to the software application using a standard protocol such as hypertext transfer protocol (HTTP). As another example, an ASP can provide a software application through a digital distribution platform. The digital distribution platform allows subscribers to download software applications electronically to a computing device. Computing devices can include a conventional personal computer or mobile devices such as smartphones, netbooks, personal digital assistants and tablet PCs.

The term "mobile application service provider" (MASP) shall be used to describe an ASP that provides one or more software applications for use on a mobile device.

The term "subscriber" shall be used to describe an entity that enters into an agreement, formally or informally, to use a software application provided by an ASP. A subscriber may be, but is not necessarily, an end-user of the software application.

The term "information repository" shall be used to describe an entity controlling information associated with a subscriber to which an ASP may request access. An information repository may, but does not necessarily, own the information associated with a subscriber. Examples of information repositories include a hospital controlling health records, a financial institution controlling financial transaction data, and a wireless carrier (i.e., an entity that provides wireless telecommunication services) controlling data associated with the location of a communication device.

Figure 1:
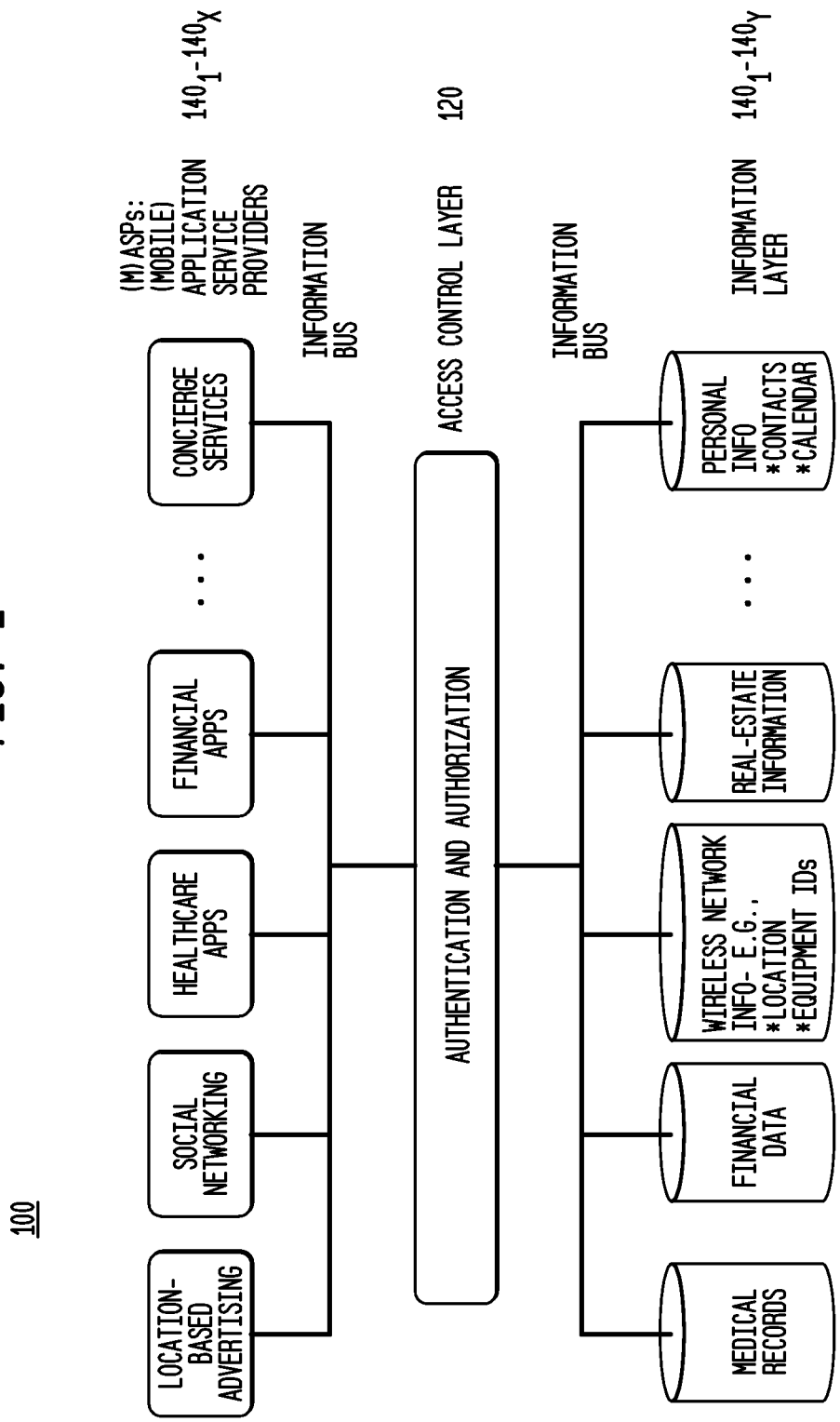
FIG. 1 is a block diagram of the inventive system.

FIG. 1 provides an overview of the present invention to be described hereinbelow.

FIG. 1 illustrates a system 100 in which a trusted entity 120 acts as an access control layer to accommodate a plurality of ASPs 140$_1$-140$_X$ on one side and a plurality of information repositories 160$_1$-160$_Y$ on the other side.

An ASP 140$_X$ can perform a service via the software application for the subscriber based on information associated with the subscriber. Examples of such information include, but are not limited to, a subscriber's health records, a subscriber's financial transaction data, a subscriber's preferences and a location of a subscriber's wireless communication device. Such information can be sensitive and/or confidential in nature. It is noted that information associated with a subscriber can be, but is not necessarily, owned by the subscriber.

Examples of targeted and/or relevant services offered by ASP 140$_X$ based on information associated with one or more subscribers include, but are not limited to: (a) a traffic congestion alerting application that detects mobile phone end-users in an area about to be affected by traffic incident and notifies them accordingly; (b) a mobile marketing application that combines an end-user's preferences with his location to notify him of timely offers that are of interest and value to him; (c) a social networking application that indicates to an end-user that "friends" are nearby; (d) a credit card fraud alert application that notifies end-users of potential fraudulent activity based on the location of the transaction and the end-user's location; (e) a healthcare application that reminds an end-user to take his medication at appropriate times based on the end-user's health records; and (f) a community notification application that provides emergency and other public interest alerts based on an end-user's location.

Information associated with a subscriber can be used in very different service environments. For example, a subscriber's location may be used to provide traffic congestion alerting service to the subscriber. A subscriber's location may also be used to provide mobile marketing and advertising service to the subscriber. An entity may be willing to subscribe to a service provided by ASP $140_X$ and to authorize use of information regarding his location by ASP $140_X$ for receiving a traffic congestion alert, but may not be willing to authorize use of the same information by another ASP for receiving a mobile advertisement.

In system 100, the trusted entity 120 can determine an access control rule, based on authentication and authorization features, to be enforced against an ASP making a request for information associated with a subscriber. The trusted entity 120 can then enforce the access control rule against the ASP. Accordingly, as shown in FIG. 1, the trusted entity 120 serves as an access control layer between the plurality of ASPs $140_1$-$140_X$ and the plurality of information repositories $160_1$-$160_Y$.

The term "authentication" shall be used to describe an act of establishing, confirming, or verifying a claimed identity as the sole originator of a message.

The term "authorization" shall be used to describe an act of specifying a subject's access rights or defining access policy to a resource.

First Embodiment

Figure 2:
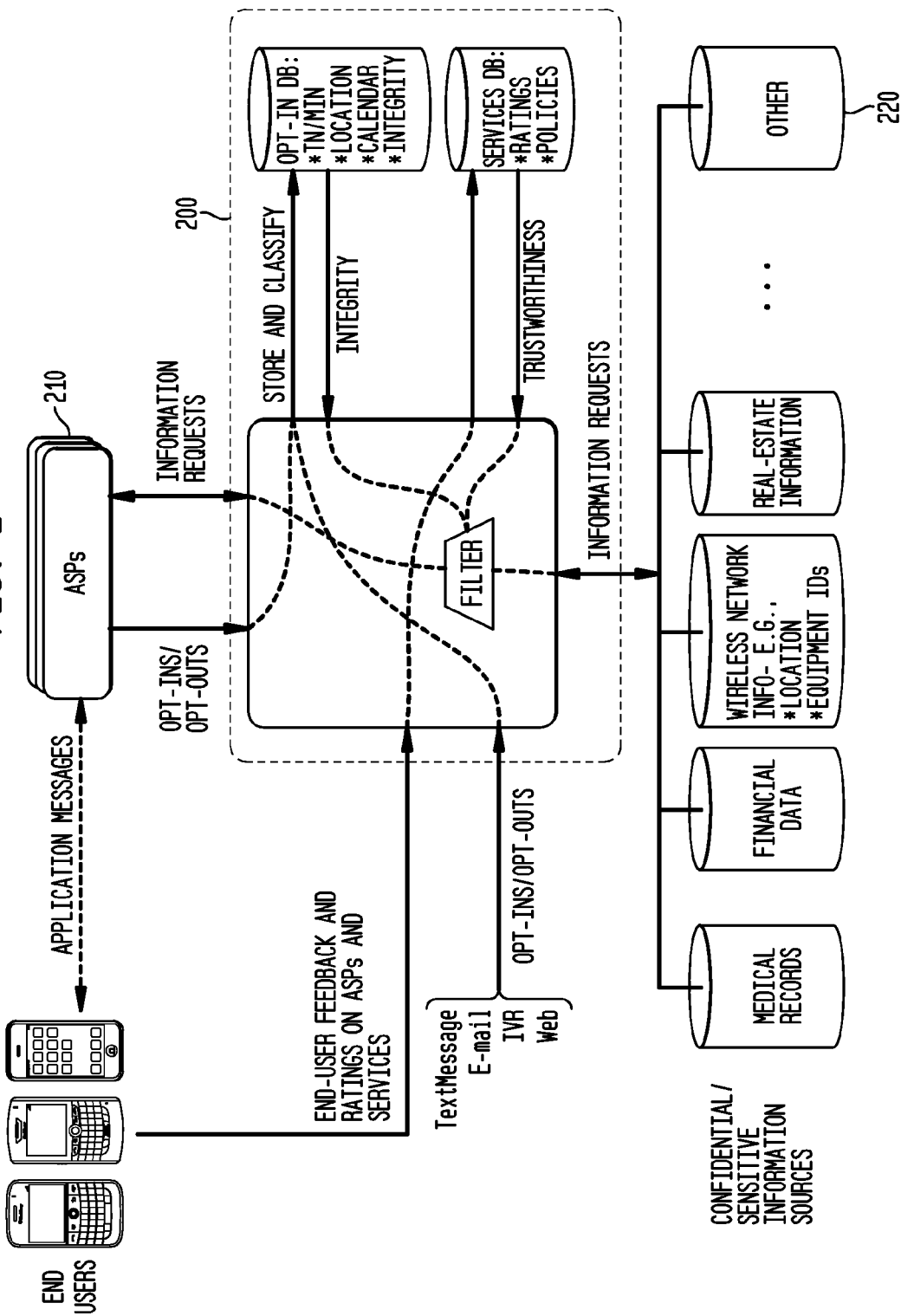
FIG. 2 illustrates a trusted entity according to a first embodiment of the invention.

FIG. 2 illustrates a trusted entity 200 according to a first embodiment of the invention. Features of the trusted entity 200 are described below without any suggestion that they must in all cases be separately provided.

The features of the trusted entity 200 are described below with respect to a single information repository 220 and a single ASP 210 making a request to the trusted entity 200 for information controlled by the information repository 220. However, it is understood that the trusted entity 200 can accommodate a plurality of information repositories and a plurality of ASPs.

Figure 3:
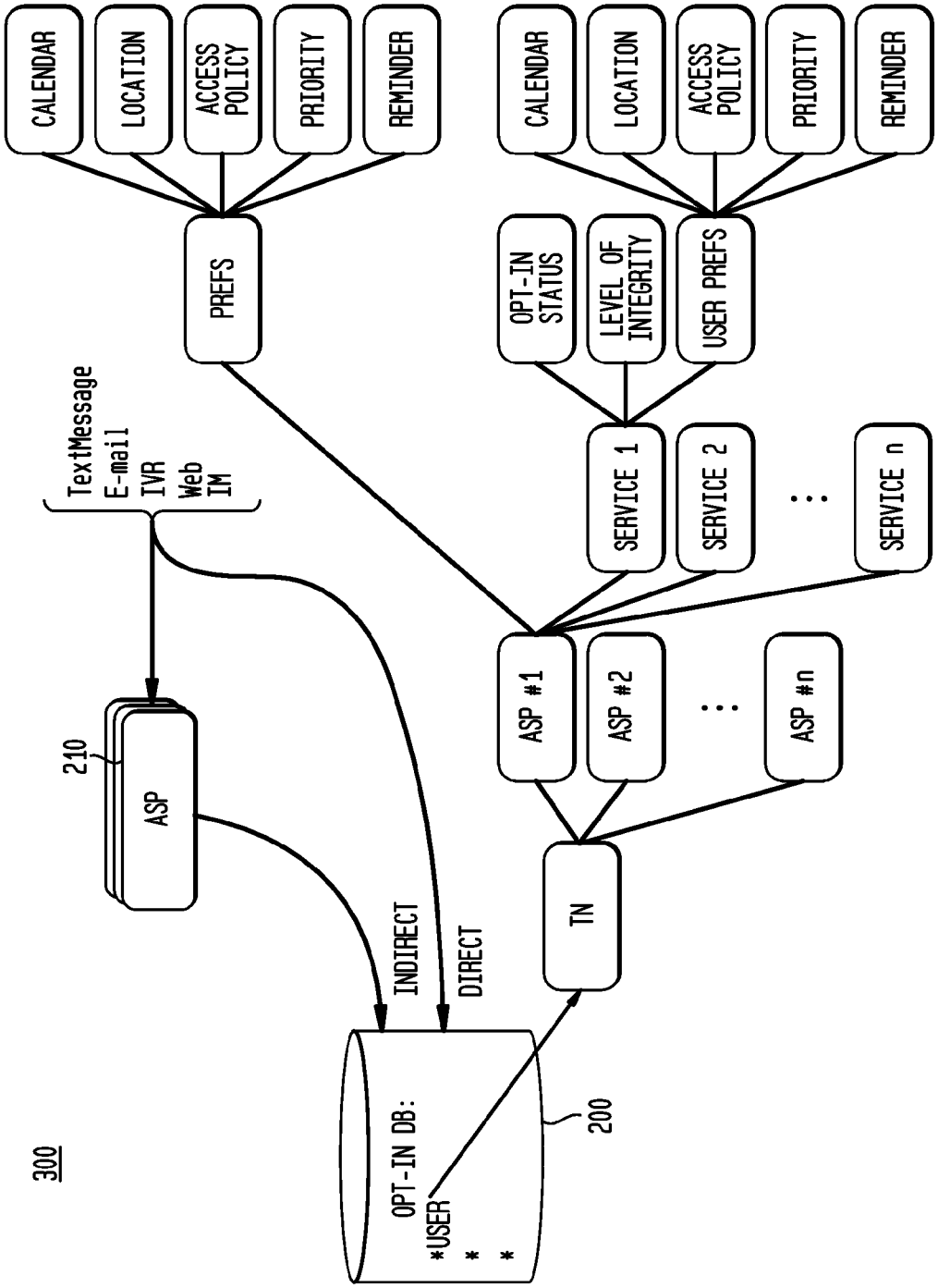
FIG. 3 illustrates a subscriber properties management feature of a trusted entity according to the first embodiment of the present invention.

FIGS. 2 and 3 illustrate a subscriber properties management feature 300 of the trusted entity 200.

The subscriber properties management feature 300 can provide a mechanism and process for managing subscriptions to a software application provided by an ASP 210.

To subscribe to a software application, an opt-in mechanism and process is provided for an entity to send an opt-in message signaling a choice to subscribe to a service provided by an ASP 210. Similarly, an opt-out mechanism and process is provided for a subscriber to send an opt-out message signaling a choice to unsubscribe from a service provided by an ASP 210.

As broadly used herein, the term "opt-in" shall be used to describe choosing to explicitly join or permit something, the default option being exclusion or avoidance. As broadly used herein, the term "opt-out" shall be used to describe choosing explicitly to not participate or not allow, the default option being to join or to permit.

The subscriber properties management feature 300 can provide a mechanism and process for direct and indirect opt-ins and/or opt-outs.

Through a direct opt-in/opt out mechanism and process, entities subscribing to or unsubscribing from a service can interact directly with the trusted entity 200 via, for example, short message service (SMS), e-mail, instant message (IM), web portal, and interactive voice response (IVR), as shown in FIG. 2.

The direct opt-in/opt-out mechanism and process can provide subscribers with a confirmation message that includes instructions on how to opt-out of a service in the future. The confirmation message can be delivered using the same communication channel used by the original opt-in message. The direct opt-in/opt-out mechanism and process can also provide an ASP 210 with notification about the opt-in or opt-out.

Through an indirect opt-in/opt-out mechanism and process, an ASP 210 can provide the trusted entity 200 with a list of subscribers that have subscribed to a service through an opt-in message to the ASP 210 and/or a list of subscribers that have unsubscribed from a service through an opt-out message to the ASP.

With an indirect opt-in and/or opt-out mechanism and process, the trusted entity 200 may enforce an explicit confirmation policy by sending a message to the opted-in/opted-out entity asking for confirmation.

The subscriber properties management feature 300 can provide a mechanism and process for multi-factor opt-in. Thus, an entity subscribing to a service may be required to opt-in to a service based on multiple ownership factors. For example, an entity may opt-in to a service through a web portal, but may then be required to confirm the opt-in through a confirmation e-mail.

The subscriber properties management feature 300 can provide a mechanism and process for determining/classifying a level of integrity of an opt-in message. The level of integrity is a measure of trust that the trusted entity 200 has regarding who initiated an opt-in to an ASP service.

The trusted entity can determine and/or classify a level of integrity of an opt-in message based upon factors including, but not limited to, whether the opt-in entry was made directly or indirectly, which communication channel was used in the opt-in process (e.g., through SMS, e-mail, IM, web portal, and/or IVR) and whether a single or multi-factor opt-in mechanism was used.

The subscriber properties management feature 300 can provide a mechanism and process for maintaining and updating a plurality of properties related to a subscriber. Such properties can include, but are not limited to, the following: one or more IDs associated with the subscriber, such as telephone number (TN), mobile directory number (MDN), and/or mobile identification number (MIN); a level of integrity that is a measure of the trust that the trusted entity has that the subscriber was the actual subscriber that opted-in; current status of opt-in subscription (e.g., active or suspended); a calendar that determines when subscriber information will be included in the trusted entity's response to requests for information made by an ASP; a list of geographic areas (e.g., address, route) that determine when subscriber information will be included in the trusted entity's response to requests for information by an ASP; access policy rules that determine which subscriber information parts will be included in the trusted entity's response to requests for information by an ASP; relative service priority rules that are used for prioritizing information requests made by different ASPs and/or services; and a reminder attribute used for determining how often a subscriber is notified (i.e., reminded) that he has opted-in for a particular service offered by an ASP.

The subscriber properties management feature 300 can provide a mechanism and process for supporting hierarchical subscriber property management through which an entity higher in a hierarchy may specify default properties or overwrite properties for an entity that is lower in the hierarchy. For example, in a parent-child one level hierarchy, parents may overwrite calendar, geographic area, or access policy rules associated with their children.

As described in further detail below, the subscriber properties management feature 300 can support the determination and enforcement of an ASP access control rule based on either or both a subscriber-defined access policy that is defined by a subscriber to a service provided by an ASP, and a system-defined access policy that is defined by the trusted entity.

Figure 4:
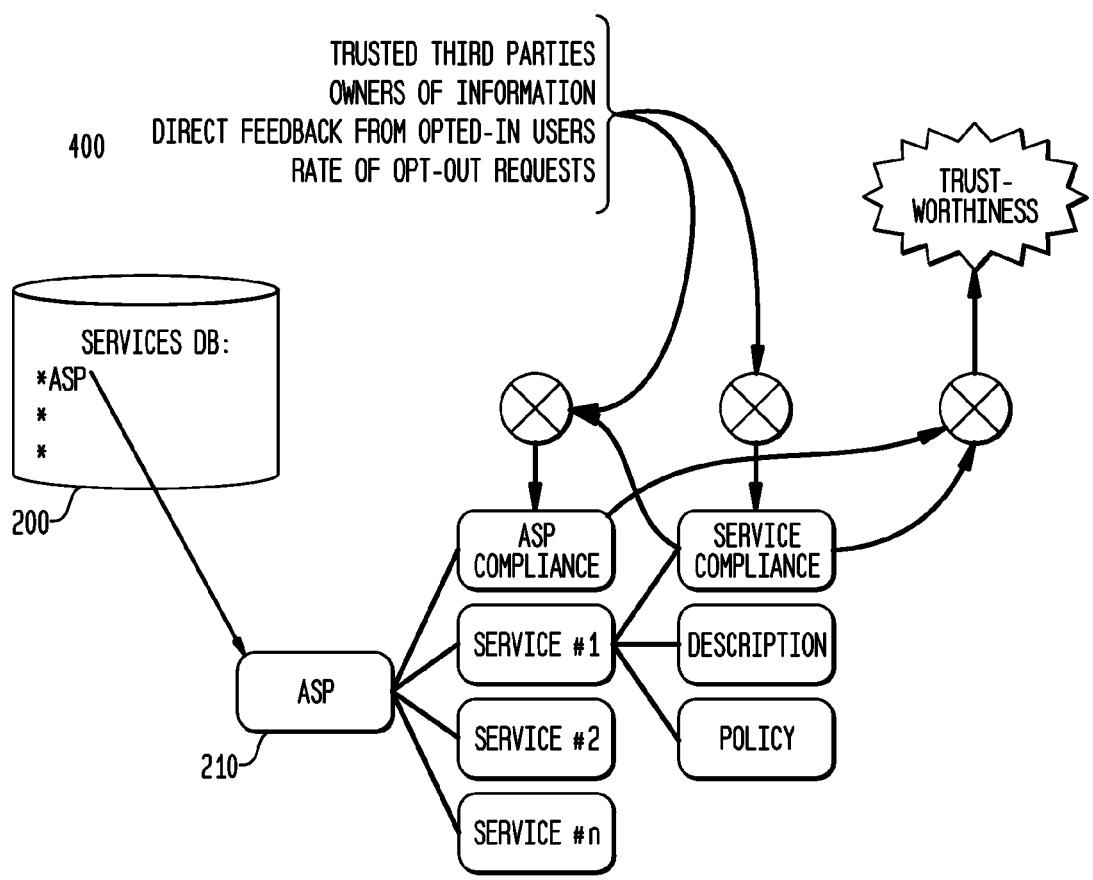
FIG. 4 illustrates an ASP management feature of a trusted entity according to the first embodiment of the present invention.

An ASP management feature 400 of the trusted entity 200 is described below with reference to FIGS. 2 and 4.

The ASP management feature 400 can provide a mechanism and process for registering the identity of an ASP 210 that may require access to information associated with subscribers.

The registering mechanism and process includes verifying that an identity is bound to the ASP 210 that makes an assertion or claim of identity. Specifically, verification includes an initial validation of an identity asserted by an ASP 210. The specific technique applied in validating the identity of an ASP can be selected to provide an assurance level commensurate with the sensitivity of information to be requested by the ASP 210. Subsequently, to make a request for information to the trusted entity 200, a registered ASP 210 may be required to assert an identity together with one or more authenticators as a means for validation.

The ASP management feature 400 can provide a mechanism and process for determining and updating a level of integrity of an identity asserted by the ASP 210. The level of integrity of an identity asserted by the ASP 210 may be based upon factors including, but not limited to, the type of authenticator presented to the trusted entity 200 and whether a single or multiple authenticators are presented to the trusted entity 200.

The ASP management feature 400 can provide a mechanism and process for maintaining and updating information associated with the one or more services offered by an ASP 210.

Information associated with a service provided by an ASP 210 can include a description of the service provided by the ASP as well as a service level agreement (SLA) entered into between the ASP 210 and the subscribers to the service.

As broadly used herein, the term "service level agreement" (SLA) shall be used to describe an agreement between at least two parties where one party is the subscriber (or an entity associated with the subscriber) and the other is the ASP. An SLA can record a common understanding about service performance metrics with corresponding service level objectives. For example, service performance metrics regarding subscriber (and/or end-user) privacy can be part of an SLA.

The ASP management feature 400 can further provide a mechanism and process for determining, maintaining and updating a service compliance level of a service provided by an ASP 210 that reflects the degree to which the service is adhering to one or more SLAs.

A service compliance level can be determined and updated in several ways. For example, the service compliance level can be determined and updated based on one or more of the following: feedback from trusted third parties, feedback from information repositories, feedback from subscribers and/or end-users, and a rate of opt-out requests.

The ASP management feature 400 can further provide a mechanism and process for determining, maintaining, and updating an ASP compliance level of an ASP 210 that reflects the overall adherence by the ASP 210 to SLAs by all of the services offered by the ASP 210, independent of individual service compliance levels.

An ASP compliance level can be determined and updated based on one or more of the following: feedback from trusted third parties, feedback from information repositories, feedback from subscribers and/or end-users, and one or more mathematical formula based on the service compliance levels of all services provided by the ASP.

The ASP management feature 400 can further provide a mechanism and process for determining, maintaining, and updating an overall trustworthiness rating for an ASP 210. The overall trustworthiness rating can be determined and updated based on the ASP compliance level and the service compliance level.

As described in further detail below, the ASP management feature 400 can support the determination and enforcement of an ASP access control rule based on a subscriber-defined access policy that is defined by a subscriber to a service provided by an ASP, and/or a system-defined access policy that is defined by the trusted entity.

The trusted entity 210 can further provide a sensitivity classification feature. The sensitivity classification feature applies a classification system to denote a level of sensitivity for different types of information associated with a subscriber. For example, the sensitivity classification system may consider location information to be less sensitive than mobile equipment IDs, which may be considered to be less sensitive than financial data or medical records.

As described in further detail below, the sensitivity classification feature can support the determination and enforcement of an ASP access control rule based on a subscriber-defined access policy that is defined by a subscriber to a service provided by an ASP, and/or a system-defined access policy that is defined by the trusted entity.

Referring back to FIG. 2, an ASP access control rule determination and enforcement feature of the trusted entity 200 is described.

An ASP access control rule defines the conditions that need to be met for an ASP 210 to be provided access to information related to a subscriber. The ASP access control rule determination and enforcement feature can determine an ASP access control rule for a particular ASP 210 based on a subscriber-defined access policy that is defined by a subscriber to a service provided by the ASP, and/or a system-defined access policy that is defined by the trusted entity 200. The ASP access control rule determination and enforcement feature can enforce an ASP access control rule by testing a request for information made by a particular ASP 210 against a subscriber-defined access policy, and/or a system-defined access policy, in order to determine if access to the requested information is permitted.

In a subscriber-defined access policy, the subscriber determines an ASP's rights to access information associated with a subscriber. A subscriber-defined access policy can be based on one or more properties related to a subscriber that is/are maintained and updated by the subscriber properties management feature 300 of the trusted entity 200.

An ASP will be permitted to access information associated with an entity only if the entity is a subscriber who has explicitly opted-in to a particular service offered by the ASP.

Moreover, an ASP's access to information associated with a subscriber can be affected by other subscriber properties, such as the above-described calendar property defined by a subscriber (that determines when subscriber information will be included in the trusted entity's response to requests for information) and the above-described geographic property defined by a subscriber (that provides a list of geographic areas for which subscriber information will be made available to an ASP).

Based on a subscriber-defined access policy, an ASP's request for information may, for example, be restricted to only those opted-in users that are within a particular geographic area and/or meet other subscriber-specified criteria.

In a system-defined access policy, the trusted entity 200 determines an ASP's rights to access information associated with a subscriber. The trusted entity 200 may determine an ASP's rights to access information associated with a subscriber based on one or more of the following: sensitivity of the requested information, the overall trustworthiness of the ASP, the ASP compliance level, the service compliance level, the level of integrity of a subscriber, and the level of integrity of the asserted identity of the ASP.

As an example, a system-defined access policy may use the level of sensitivity of the information requested by an ASP to determine the associated levels of integrity of the subscriber opt-in message and/or the trustworthiness of the ASP required to permit the ASP to access the requested information.

As another example, one or more of the service compliance level, the ASP compliance level, and the overall trustworthiness rating of an ASP may be used to determine the quality of service offered by the trusted entity 210 to a service and/or an ASP. A low service compliance level and/or ASP compliance level may result in one or both of: rate restrictions on the number of requests processed by the trusted entity 210 during a specific time period (e.g., one request per second), and restrictions on the size and quality of data returned by the trusted entity 210 in response to a specific information request (e.g., only 1,000 entries per request).

FIG. 2 also illustrates an information repository interfacing feature of the trusted entity. The information repository interfacing feature allows the trusted entity 210 to interact with information repositories on behalf of ASPs and further allows the trusted entity 210 to match an information request by a particular ASP 210 to a particular information repository 220. As such, the information repository interfacing feature provides the trusted entity 210 with access to information controlled by the information repositories on demand in response to a request by an ASP 210.

In addition to having the above-described features, other high-level capabilities of the trusted entity can include: (i) providing (near) real-time access to information associated with a subscriber; (ii) providing high reliability; (iii) maintaining an end-user opt-in/registration list and provider opt-in/registration list(s); (iv) maintaining end-user privacy and access policies related to sharing of sensitive information; (v) maintaining policies related to the use of sensitive and confidential information for analysis purposes, such policies specifying how sensitive information is accessed in an anonymous fashion; (vi) offering searching across distributed and fragmented sensitive and confidential information attributes, similar to existing Web search engines; (vii) supporting open interfaces for receiving updates from owners/creators/custodians when they make changes to existing sensitive or confidential information; (viii) providing open interfaces for notifying authorized entities when changes are detected.

One or more advantages may be realized with a trusted entity having the above-described features.

A possible advantage may be that the service compliance level, ASP compliance level, and overall trustworthiness rating may be used as a mechanism to deter ASPs from abusing the service provided to subscribers because each metric can reflect the feedback provided by subscribers and/or end-users.

Another possible advantage may be that an ASP is deterred from opting-in users without their explicit authorization.

Another possible advantage may be an increased ease by which an ASP can develop or create software applications that work across carriers that need to access several information sources, and/or that need "opt-in" services.

Other possible advantages can include: preservation of end-user privacy; support of a feedback mechanism to enable reporting of abuses or policy/practice infractions by ASPs; sending periodic reminders to end-users to inform them of opted-in services and sensitivity of information accessed for each service; enabling information owners to monetize their information, while providing assurances that the information will not be abused. Moreover, this inventive network-based approach advantageously makes it more easily scalable, offers better support for the many different types of handset devices, and reduces device batter power requirement.

Second Embodiment

A second embodiment of the present invention is a multitenant hosted service that implements the above-described features of the trusted entity. The multitenant hosted service can be accessed, for example, via a standard Web-based interface. Multitenancy in this context refers to the ability to deliver software to multiple client organizations (or tenants) from a single, shared instance of a software.

A possible advantage of multitenancy can be cost effectiveness. Sharing software, hardware, application development, and sharing costs between tenants can lower the costs for each tenant. Furthermore, sharing a single instance of an application between tenants can provide other possible advantages. For example, all tenants can be simultaneously upgraded whenever the application is upgraded.

Third Embodiment

Figure 5:
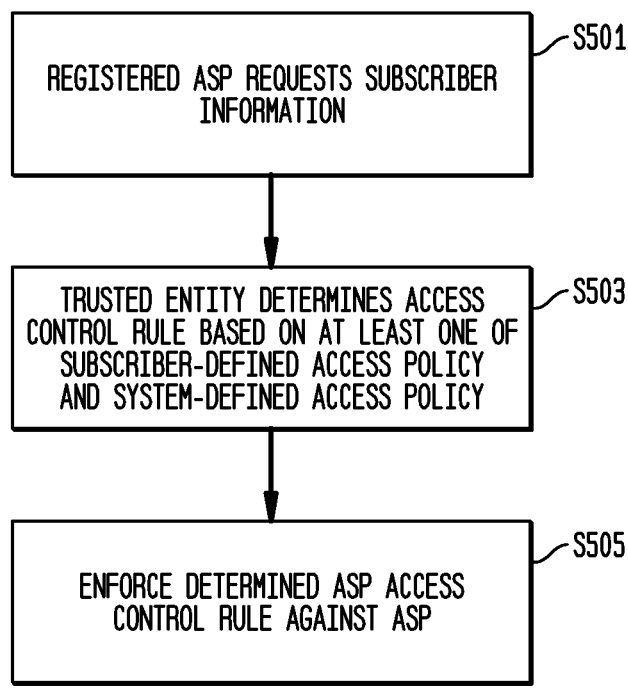
FIG. 5 illustrates a method according to a third embodiment of the invention.

A method for mediating access by one or more ASPs to information controlled by one or more information repositories according to a third embodiment of the present invention is described below with reference to FIGS. 2 and 5.

It is to be understood that the specific ordering of the combination of steps described below is merely illustrative and that the invention can be performed using a different combination or ordering of the steps. Not all steps discussed here necessarily occur in every scenario. Other steps can be included without departing from the scope of the present invention.

In a step 501, a registered ASP 210 requests subscriber information for all or a subset of opted-in subscribers from the trusted entity 200 by sending an information request to the trusted entity 210 using a specific protocol and message format (e.g., XML/HTTP).

As part of or in addition to step 501, the trusted entity 200 may require a registered ASP 210 to present one or more authenticators to validate its asserted identity. For example, the trusted entity 200 will not process a request for information if the asserted identity of a registered ASP 210 cannot be validated.

in a step 503, the trusted entity 200 determines an ASP access control rule based on at least one of a subscriber-defined access policy, and a system-defined access policy, as described above.

In a step 505, the trusted entity 200 enforces the ASP access control rule determined in step 503 against the ASP 210 and the information request made by the ASP 210. That is, the trusted entity 200 utilizes the ASP access control rule determined in step 503 to filter the information request and determine whether the ASP 210 has rights to access the requested information controlled by an information repository 220.

As an example, the trusted entity 200 can determine the level of sensitivity of the requested information and compare the determined sensitivity of the requested information against the level of integrity of the subscriber's opt-in message and the trustworthiness of the ASP 210, to filter the information request and decide whether to return the requested information to the ASP.

Fourth Embodiment

Business models according to a fourth embodiment of the present invention will be described below.

In the above-described embodiments of the present invention, ASPs can contract for service with the trusted entity. The exact type of service agreement can be flexible. For example, the service agreement can be subscription based and/or usage based (i.e., pay per "dip"). The trusted entity can pay for services from the different repositories of confidential/sensitive information (e.g., wireless carrier or a wireless network information provider). The compensation to the repositories of confidential information may then motivate such repositories to make information available through the trusted entity to ASPs. The trusted entity can therefore act as an aggregator of information and will then be a common clearinghouse and/or brokerage of this information for a plurality of ASPs.

ASPs can employ a variety of business models in order to generate revenue, some of which can be used to pay for services from the trusted entity. Examples of these models can include, but are not limited to, user subscriptions, advertising sponsorship, and brand/or property sponsorship (e.g., a shopping mall paying to provide location based concierge and alert services to patrons who have opted in).

Figure 6:
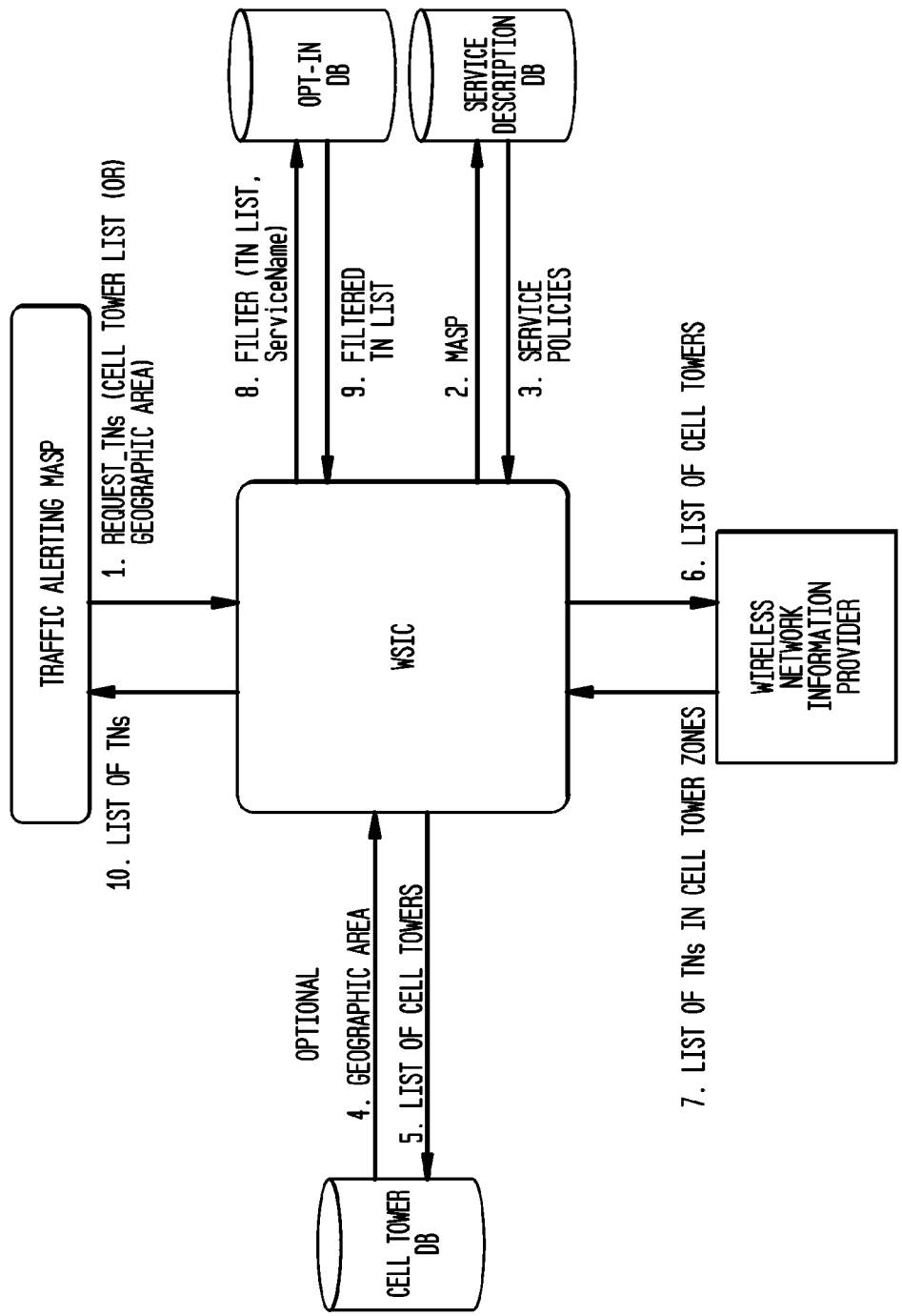
FIG. 6 illustrates a traffic congestion alert notification application.

FIG. 6 illustrates a first exemplary implementation of the present invention. A traffic congestion alert notification system 600 is described.

System 600 uses proximity sensors, such as WiFi and mobile phone sensors, to determine the location of all cell phones in a particular area (e.g., hotel or casino). At step 1, the traffic alerting MASP will send a list of International Mobile Equipment Identity (IMEI) numbers that the MASP has acquired through its local sensor network. After consulting its service policy DB (see steps 2 and 3), the trusted entity will query (see steps 6 and 7) a wireless network information provider for the corresponding telephone number (TN) for each of the IMEIs. The trusted entity will then filter (see step 8) this list of TNs against the "opt-in" list for the specific service, and return (see steps 9 and 10) the filtered list to the MASP. The MASP can then use the list of TNs to send messages, alerts, or notifications to each end-user's cell phone.

Figure 7:
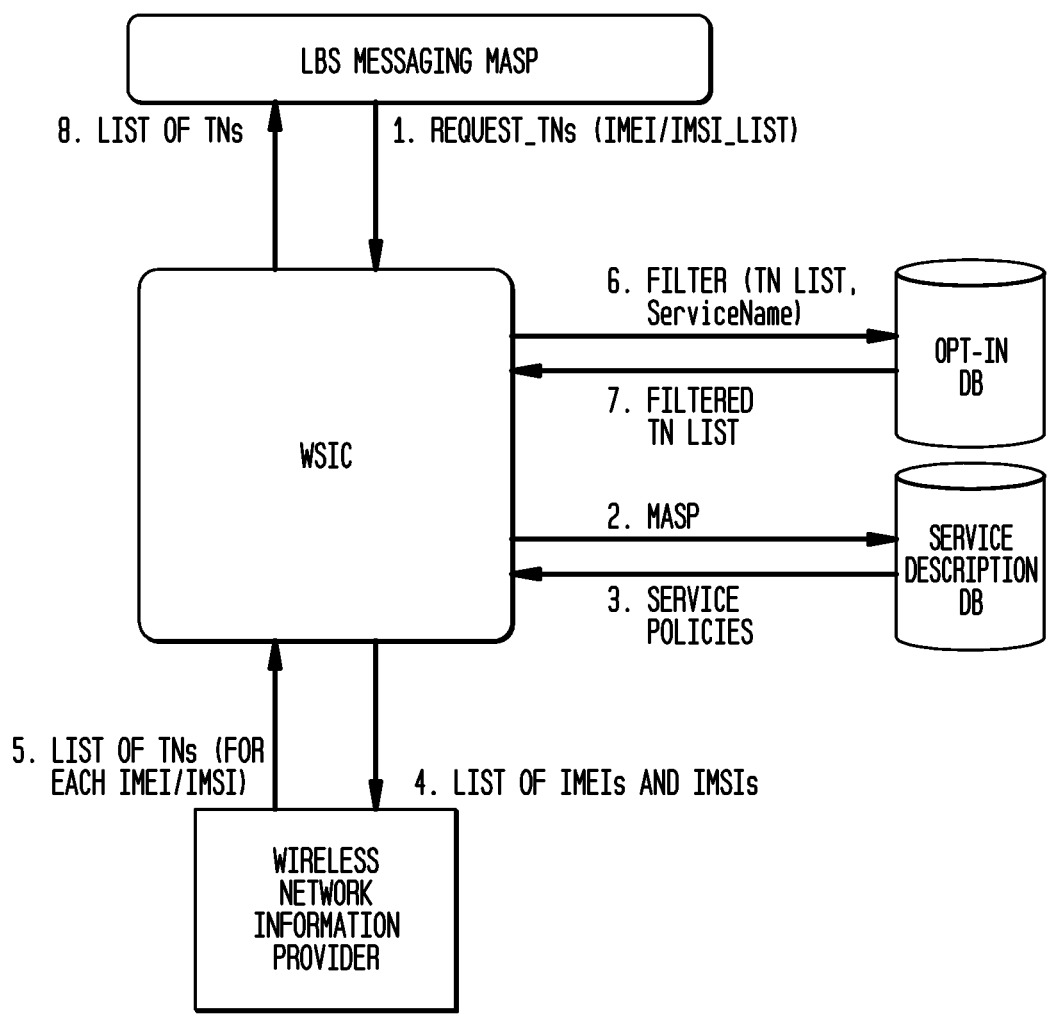
FIG. 7 illustrates a wireless sensor-based notification and messaging application.

FIG. 7 illustrates a second exemplary implementation of the present invention. A wireless sensor-based notification and messaging system 700 is described.

At step 1, the LBS Messaging MASP detects traffic congestion and then requests from a trusted entity a list of all subscribers that are in the traffic congestion zone (specified, for example, by cell-tower IDs or GPS coordinates). At steps 2 and 3, the trusted entity first consults its service policy DB, and then at step 4 requests a list of all wireless subscribers in the requested traffic congestion zone from the wireless carrier(s) by using cell-tower IDs. At step 5, the wireless carrier(s) returns a list of all wireless subscribers in the requested traffic congestion zone based on cell-tower IDs. At steps 6 and 7, the trusted entity then filters the list of all wireless subscribers with the "opt-in" list for the traffic congestion alerting application. At step 8, this filtered list is then returned to the MASP. The MASP can then send traffic congestion alerts to the mobile devices of the wireless subscribers.

Figure 8:
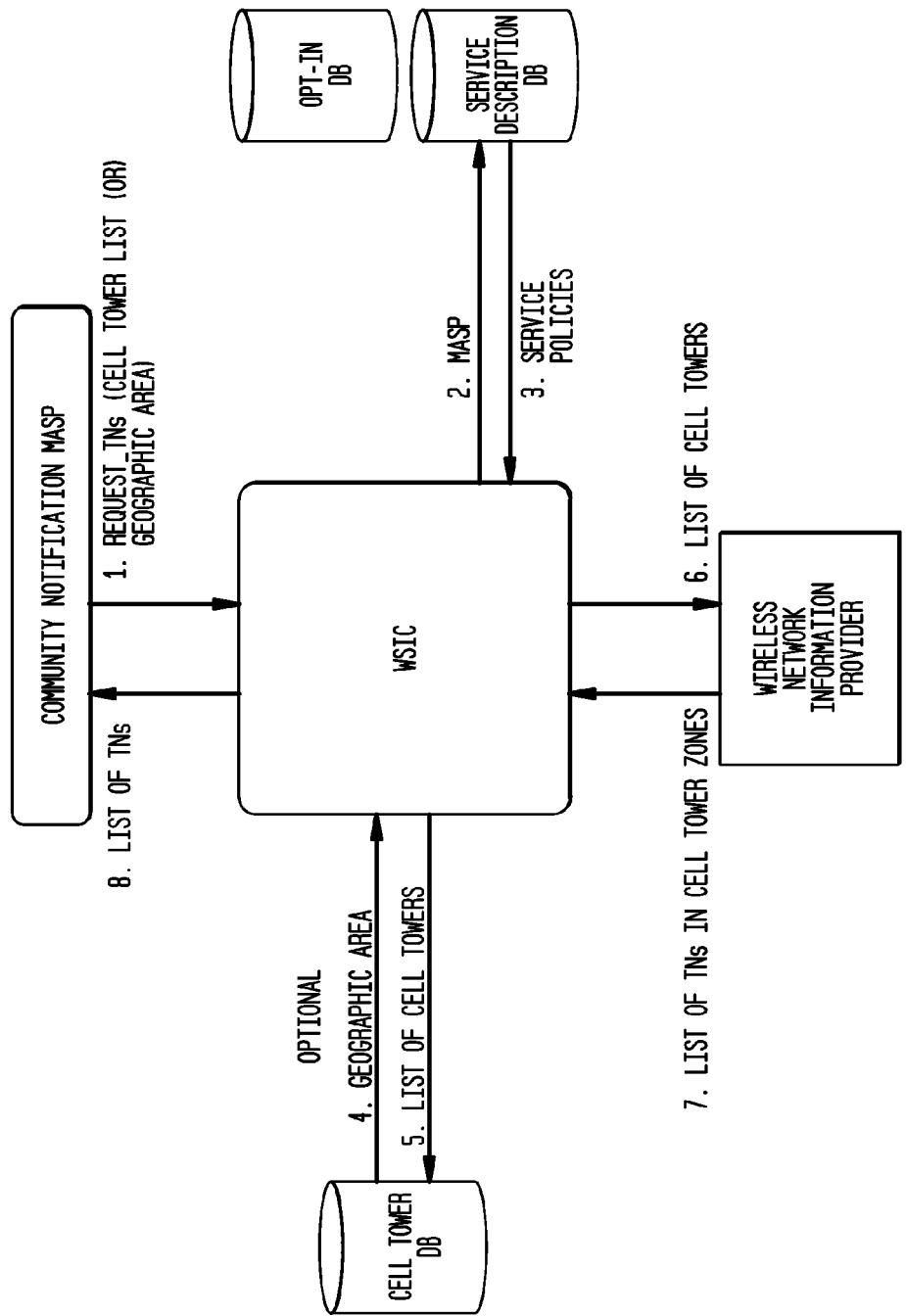
FIG. 8 illustrates a community notification application.

FIG. 8 illustrates a third exemplary implementation of the present invention. A community notification application 800 is described.

The trusted entity enables a community notification MASP to provide community notification services in the form of authority-to-citizen alerting for geo-targeted areas (e.g., a specific county). At step 1, the MASP provides the trusted entity with a list of cell towers in the specific area or a geographic area defined by a set of GPS coordinates. If the MASP provides a geographic area defined by GPS coordinates, then the trusted entity will determine all the cell towers in the specified geographic area. Once the trusted entity has the list of cell towers, the functions the trusted entity performs are similar to the traffic congestion alerting applications except that in this case, there is no opt-in list to screen TNs against.

For the community notification application, opt-in is not required, but a community notification MASP implicitly must undergo a more stringent approval process than other kinds of MASPs and the authentication and security between the community notification MASP and the trusted entity must be at a higher level.

The above-described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A trusted entity for use in a communication network, the communication network comprising an application service provider that provides one or more computer-based services to one or more subscribers, the trusted entity comprising:

a computing device for receiving downloads of software applications, including:

an access control rule determination means for determining an access control rule to be enforced against the application service provider making a request for information associated with a subscriber, the access control rule determined based on at least one of a subscriber-defined access policy and a system-defined access policy;

a system-defined access policy determination means for determining the application service provider's rights to access information associated with the subscriber based on one or more of a trustworthiness rating of the application service provider, a level of integrity of the application service provider, and a level of integrity of the subscriber;

a subscriber-defined access policy determination means for determining the application service provider's rights to access information associated with the subscriber based on at least the subscriber's preferences;

a subscriber properties management means comprising:
  a subscription management portion managing an opt-in message and an opt-out message from the subscriber, wherein the opt-in message and the opt-out message is performed by either a direct mechanism or an indirect mechanism;
  a subscriber identity integrity determining portion determining a level of integrity in the subscriber's opt-in message; and
  a subscriber preferences management portion maintaining the subscriber's preferences; and
an access control rule enforcement means for enforcing the access control rule against the application service provider.

2. The trusted entity according to claim 1, further comprising:
  a sensitivity of requested information determining means for determining a sensitivity of the information requested by the application service provider.

3. The trusted entity according to claim 1, further comprising:
  an application service provider trustworthiness rating determining means for determining an overall trustworthiness of the application service provider.

4. The trusted entity according to claim 3, wherein the overall trustworthiness of the application service provider is determined based one or more of:
  a measure of compliance on the part of a computer-based service offered by the application service provider to service level agreements between the computer-based service and the application service provider; and
  a measure of compliance on the part of the application service provider to all service level agreements for all computer-based services offered by the application service provider.

5. A method of mediating access by an application service provider to information associated with one or more subscribers of one or more computer-based services provided by the application service provider, the method comprising:
  determining an access control rule to be enforced against the application service provider making a request for information associated with a subscriber, the access control rule being determined based on at least one of a subscriber-defined access policy and a system-defined access policy;
  determining, by a hardware processor, the application service provider's rights to access information associated with the subscriber based on one or more of a trustworthiness rating of the application service provider, a level of integrity of the application service provider, and a level of integrity of the subscriber;
  determining the application service provider's rights to access info illation associated with the subscriber based on at least the subscriber's preferences;
  managing an opt-in message and an opt-out message from the subscriber through either a direct or an indirect process;
  determining a level of integrity in the subscriber's opt-in message; and
  maintaining the subscriber's preferences; and
  enforcing the access control rule against the application service provider.

6. The method according to claim 5, further comprising: determining a sensitivity of the information requested by the application service provider.

7. The method according to claim 5, further comprising: determining an overall trustworthiness of the application service provider.

8. The method according to claim 7, wherein the overall trustworthiness of the application service provider is determined based on one or more of:
  a measure of compliance on the part of a computer-based service offered by the application service provider to service level agreements between the computer-based service and the application service provider; and
  a measure of compliance on the part of the application service provider to all service level agreements for all computer-based services offered by the application service provider.

9. A non-transitory computer readable storage media having stored thereon a computer program for mediating access by an application service provider to information associated with one or more subscribers of one or more computer-based services provided by the application service provider, that, when executed by one or more processors, causes the one or more processors to:
  determine an access control rule to be enforced against the application service provider making a request for information associated with a subscriber, the access control rule being determined on at least one of a subscriber-defined access policy and a system-defined access policy;
  determine the application service provider's rights to access information associated with the subscriber based on one or more of a trustworthiness rating of the application service provider, a level of integrity of the application service provider, and a level of integrity of the subscriber;
  determine the application service provider's rights to access information associated with the subscriber based on at least the subscriber's preferences;
  manage an opt-in message and an opt-out message from the subscriber through a direct or an indirect mechanism;
  determine a level of integrity in the subscriber's opt-in message; and
  maintain the subscriber's preferences; and
  enforcing the access control rule against the application service provider.

10. The non-transitory computer readable storage media as recited in claim 9, that, when executed by the one or more processors, causes the one or more processors to:
  determine a sensitivity of the information requested by the application service provider.

11. The non-transitory computer readable storage media as recited in claim 9, that, when executed by the one or more processors, causes the one or more processors to:
  determine an overall trustworthiness of the application service provider.

12. The non-transitory computer readable storage media as recited in claim 11, that, when executed by the one or more processors, causes the one or more processors to determine an overall trustworthiness of the application service provider based on one or more of:
  a measure of compliance on the part of a computer-based service offered by the application service provider to service level agreements between the computer-based service and the application service provider; and
  a measure of compliance on the part of the application service provider to all service level agreements for all computer-based services offered by the application service provider.

* * * * *

UNITED STATES PATENT AND TRADEMARK OFFICE
CERTIFICATE OF CORRECTION

| | | |
|---|---|---|
| PATENT NO. | : 8,683,553 B2 | Page 1 of 1 |
| APPLICATION NO. | : 12/652772 | |
| DATED | : March 25, 2014 | |
| INVENTOR(S) | : Loeb et al. | |

It is certified that error appears in the above-identified patent and that said Letters Patent is hereby corrected as shown below:

Title Page, in Item (75), under "Inventors", in Column 1, Line 2, delete "Mendham," and insert -- Long Valley, --, therefor.

In the Specification

In Column 9, Line 1, delete "in a step" and insert -- In a step --, therefor.

In the Claims

In Column 11, Line 55, in Claim 5, delete "info illation" and insert -- information --, therefor.

Signed and Sealed this
Eleventh Day of November, 2014

Michelle K. Lee
*Deputy Director of the United States Patent and Trademark Office*